United States Patent [19]

Berlin et al.

[11] Patent Number: 4,587,674
[45] Date of Patent: May 13, 1986

[54] DISPOSABLE CAP WITH STRAPS

[75] Inventors: Frank Berlin, New York, N.Y.; Leonard McGuire, Tulsa; Eugene Campbell, Bixby, both of Okla.

[73] Assignee: Armin Poly-Version, Inc., Jersey City, N.J.

[21] Appl. No.: 564,072

[22] Filed: Dec. 16, 1983

[51] Int. Cl.$^4$ .............................................. A42B 1/04
[52] U.S. Cl. ........................................ 2/195; 428/192
[58] Field of Search ................ 2/171.5, 192, 197, 195; 428/192

[56] References Cited

U.S. PATENT DOCUMENTS

| 3,217,971 | 11/1965 | Shvetz | 383/77 |
| 4,445,230 | 4/1984 | Spadaro | 383/77 |
| 4,453,276 | 6/1984 | Smith | 2/195 |
| 4,459,706 | 7/1984 | Smith | 2/195 |

Primary Examiner—Christopher A. Henderson
Attorney, Agent, or Firm—Roberts, Spiecens & Cohen

[57] ABSTRACT

A disposable cap is formed by sealing together two sheets of thermoplastic film in such a manner as to form an enclosure having an access opening with respect thereto. Adjacent the access opening in one of the sheets of film is cut a T-shaped arrangement of slits which form two straps or ties in the resulting product. These straps or ties are located adjacent the opening and are attended to adapt the construction to the various head sizes of various users. The excess film material is trimmed off. A relatively large seal is effected adjacent the roots of the ties or straps in order to provide an anchorage for the same.

6 Claims, 3 Drawing Figures

DISPOSABLE CAP WITH STRAPS

FIELD OF THE INVENTION

This invention relates to disposable plastic articles as well as to methods and apparatus for fabricating the same.

BACKGROUND

Disposable plastic articles have been well known in the prior art. Examples of patents showing such articles are U.S. Pat. Nos. 3,681,784 and 3,384,083. Still other patents relating to disposable plastic articles include U.S. Pat. Nos. 3,870,150 and 3,923,577.

In addition to the above, disposable or dispensible head coverings are shown in U.S. Pat. Nos. 2,294,593; 3,431,561; 3,571,812 and 3,710,396. J. M. Bailey shows, in U.S. Pat. No. 2,294,593 a protector for preserving a woman's hairdo and make-up. This protector consists of a hood formed of a piece of film-like material with edges thereof being provided with flaps to which are attached tying cords to be tied under the wearers chin.

R. J. Hummel in U.S. Pat. No. 3,431,561 reveals a method of making a closable plastic headware cap arrangement having reinforcing side flaps. The article is made from plastic web stock and involves the steps of continuously folding up the edge portions of a tensioned thermoplastic web while pulling it and then folding the web along a center line so that the edge flaps are on the outside. Finally, the fold web is melt-severed along its length into elongated sections with the severed edges being fused thereby to form a plurality of similar plastic caps.

Robert Speevak shows in U.S. Pat. No. 3,571,812 a hat or cap made of a sleeve of flexible material which is formed into four panels with two opposing panels being folded inwardly. All of the panels are joined together at one end of the sleeve to form a cap.

Barbara Tomlinson shows in U.S. Pat. No. 3,710,396 a dispensible head covering for being dispensed from a box or roll. Perforations are provided separating one unit from another. Each of the units have perforated or scored ear tab portions and are formed from two layers of stretchable material connected at their top edges to one another with optional heat seal front edges to accommodate various head sizes.

SUMMARY OF THE INVENTION

It is an object of the invention to provide an improved dispensible head covering or the like which is superior to the aforegoing in economy of manufacture.

It is a further object of the invention to provide an improved cap or hat structure which is disposable and which is readily manufactured by mass production techniques.

It is yet another object of the invention to provide an improved hat structure which is in the form of a cap or the like and which has ties or strips formed as an integral part thereof.

In achieving the above and other objects of the invention, there is provided, generally, a disposable article of manufacture comprising face-to-face films having interconnected peripheral edges defining an enclosure having an opening, one of said films having film strips or straps connected thereto adjacent said opening, said films constituting a cap and said film strips constituting ties on this cap.

According to a particular feature of the invention, one of the films is provided with a T-shaped arrangement of slits adjacent the aforesaid opening to form the aforesaid ties. These strips are as has been implied above integrally connected to one of the films and constitute a part thereof.

According to other features of the invention, the films have parallel edges adjacent the aforesaid opening and these parallel edges are preferably offset from one another in order to enable a simple peeling of one film from the other in order to open the cap for purposes of wear.

According to another feature of the invention, the strips are of a size and disposition so as to extend cooperatively across the breadth of the one film in which the strips are formed at the aforesaid opening. Advantageously, the strips may have a width in the order of magnitude of about 1/16 to ⅜ of an inch. According to another advantageous aspect of the invention, the aforesaid film may have a height in the order of magnitude of about 6 to 16 inches to provide, upon separation, an adequate opening for various head sizes.

According to yet another feature of the invention, the films have a seal therebetween at the aforesaid peripheral edges and adjacent said strips of a width in the order of magnitude of about 1/16 to ¼ of an inch and possibly larger whereby to form an anchor for the strips.

The invention also relates to a method. In accordance with invention, a method is provided which comprises fastening sheets of films together to form an enclosure in the form of a cap with an access opening and cutting at least one of the films adjacent the opening to form ties in the cap adjacent the openings. According to a feature as has been indicated above with respect to the article of manufacture, the method advantageously comprises cutting one of the sheets along a generally T-shaped cutting line adjacent the aforementioned opening in order to form the aforesaid ties. According to still another feature of the method, the step is comprised of offsetting the edge of one sheet from the corresponding edge of the other sheet adjacent the opening. Another feature relates to the forming of an appropriate anchorage for the ties or strips or straps as will be discussed in greater hereinbelow. Still further, a feature of the invention involves fastening the sheet together while heat-sealing the same in the form of the desired cap and hot-cutting the excess film from the cap.

Another feature of the invention relates to the provision of apparatus for forming the aforesaid article of manufacture and practicing the above-mentioned method. According to the invention, this apparatus comprises first and second sources of respective sheets of film with an arrangement being provided to cut a generally T-shaped hood arrangement into one of the sheets adjacent an edge of the same, there being further more provided an arrangement to bring the sheets together and to seal the sheets together to form an enclosure having an opening adjacent the slit arrangement. Another portion of the apparatus relates to the provision of arrangement to remove the excess film from the aforementioned enclosure.

The above and other objects, features and advantages of the invention will be found in the detailed description which follows hereinafter as illustrated in the accompanying drawing.

DETAILED DESCRIPTION

Figure 1:
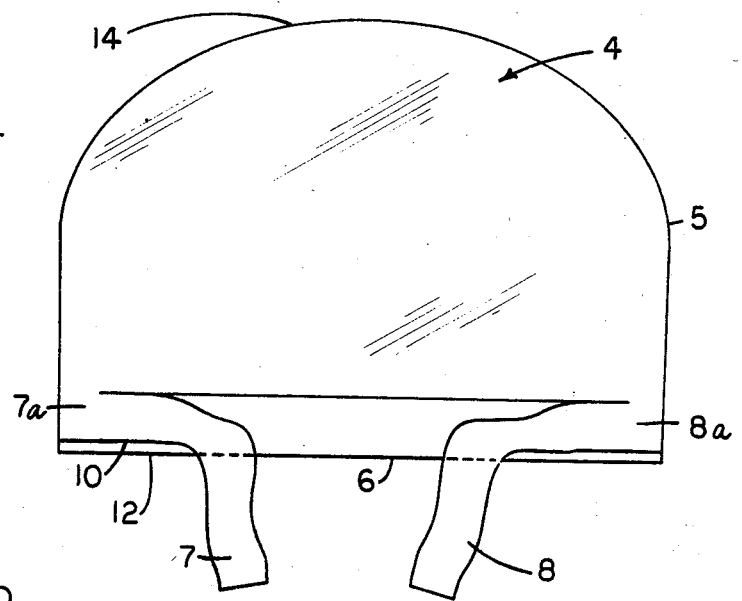
FIG. 1 is a front plan view of a disposable cap provided in accordance with a preferred embodiment of the invention.

In FIG. 1 is illustrated a cap or hat 4 which is exemplary only of a wide variety of articles of manufacture involving an opening having an access opening with respect thereto. The cap 4 is sealed along peripheral edge 5 and has an access opening indicated in the vicinity of edge 6. The cap or article of manufacture 4 is preferably formed of two sheets of thermoplastic film typically having a thickness of between about 0.005 and 0.007 inches. Attached to one of the sheets only are two ties, strips or straps 7 and 8. These strips or straps have an integral connection with the associated film of the cap 4 with which these ties are monolithic. The connections are affected in the areas indicated at 7a and 8a which are designated the roots of the strips or straps and are parts of the frontmost sheet of thermoplastic film illustrated in FIG. 1.

The frontmost strip has a bottom edge adjacent the access opening 6 indicated at 10. This edge is parallel to but spaced from the edge 12 of the rearmost sheet of film. These edges are parallel while the article of manufacture is in a position of repose and before the strips 7 and 8 have been moved to usefull position as indicated in FIG. 1. The edges 10 and 12 are offset from one another to enable facility in separating the strips so that the hat may be placed upon the head of the user. The strips 7 and 8 may be tied together in the form of a knot or a bow or otherwise. The purpose of these strips is to adapt the size of the cap to the size of the head of the particular user employing the same.

Figure 2:
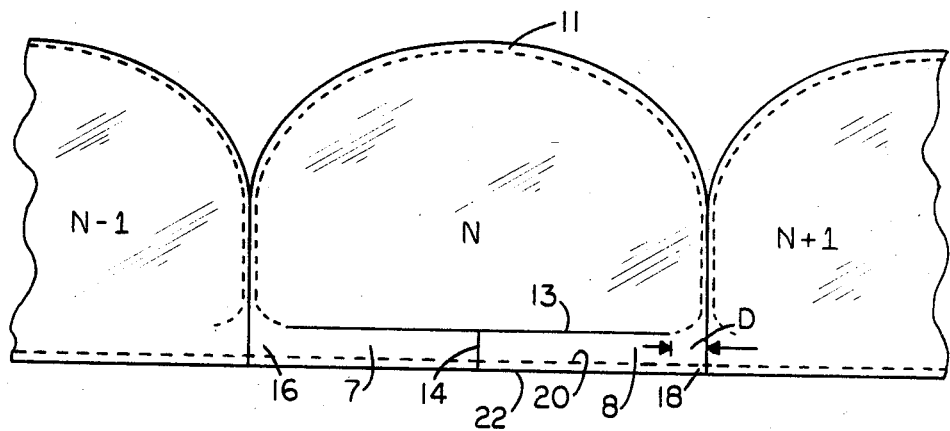
FIG. 2 illustrates a series of such caps in formative state.

In operation, a series of such caps are manufactured in sequential and serial relationship. A series of three such caps is indicated in FIG. 2 as caps N−1, N, and N+1. The peripheral seal forming the enclosure of cap N, for example, is indicated at 11. It is in somewhat exaggerated form as this seal, over the major portion of the periphery of the cap, is in generally bead-like form and is of very small transverse dimension. To form the ties 7 and 8, there is provided in only one of the films an arrangement of slits of T-shaped conformation. Two perpendicular slits are indicated at 13 and 14. Slit 13 terminates shy of the peripheral edge of cap N and is intersected by slit 14. Slit 13 is preferably, although not necessarily, parallel to the bottom edge 22 of the aggregation of caps being formed. The offset edge of the mating sheet of film is indicated at 20.

At 16 and 18, the seals to a greater width indicated at D to supply a root or anchorage for the straps so that the same will not tear loose when in use.

It is to be understood that a T-shaped arrangement has been illustrated and discussed hereinabove. This T-shaped arrangement may take other forms such as, for example, a Y-shaped arrangement or the like. It is not necessary that the slits be of rectilinear configuration although a rectilinear configuration is preferred. The concept is that of providing a simple slit arrangement adjacent the opening of the cap to form, in the lower peripheral edge thereof, an arrangement of two ties or straps which may be employed to adjust the useful size of the cap construction.

Figure 3:
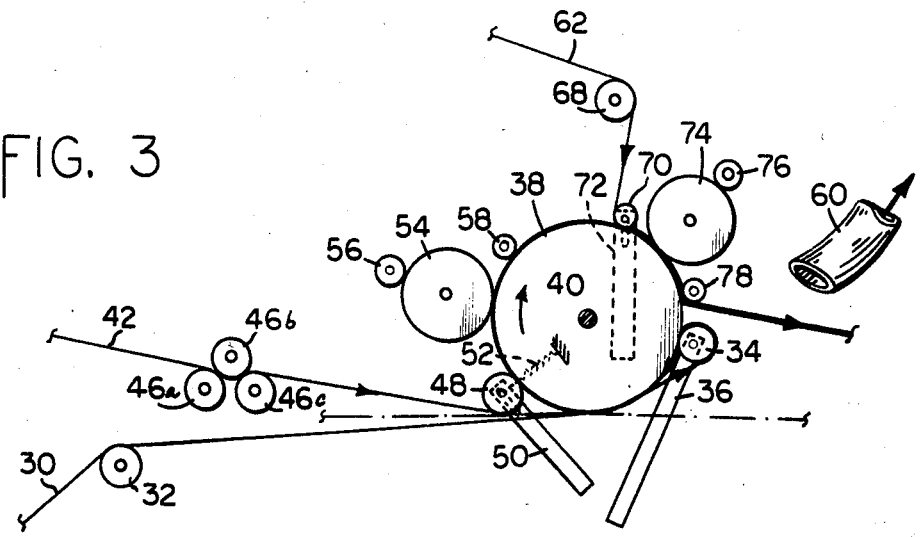
FIG. 3 diagrammatically illustrates the apparatus and method of the invention.

Turning next to FIG. 3 there is shown an apparatus that is used for accomplishing the method of the present invention and for forming the improved article of manufacture of the present invention. A first web 30 of a flexible moisture absorbent material, such as paper that is adapted to form a support layer, is passed over a tension roller 32 which is suitably journaled for rotation. The web of paper 30 then passes over and almost completely around a lay-on roller 34 rotatably mounted on a pivotally supported arm 36. The roller 34 applies the paper to the peripheral surface of a carrier such as a drum 38 adapted to rotate about an axle 40. Suitable means such as a motor (not shown) may be used for driving the drum 38.

Concurrently with the feeding of the paper web 30, a heat sealable, thermoplastic film layer or sheet 42 typically between 0.0005 and 0.007 inch thick is passed through a plurality of tension rollers 46a, 46b and 46c that transport the layer 42 to an adjustable lay-on roller 48 pivotally mounted on an arm 50. Spring 52 biassing the roller 48 towards the peripheral surface of the drum 38 so that film layer 42 is pressed downwardly on the surface of the paper web 30.

While the drum 38 rotates the paper layer 30, the film layer 42 is carried by the peripheral surface thereof past a die member 54 that is provided with selected heated portions in the shape of the desired T-shaped slit arrangement. The heated portions of the die member 54 will have the shape of slit arrangement shown in FIG. 3. When the film layer 42 is passed between the peripheral surfaces of the rotating die member 54 and the drum 38, the heat from the die member will cut the layer 42 thereby to form the desired slits. A roller 56 adapted to apply a suitable mold release agent such as silicone may be provided in contact with the peripheral surface of the heated die member 54. Immediately downstream of the heated die member 54, in the direction of rotation of the drum member 38, there is provided a film and paper support roller 58 that serves to retain the film on the surface of the paper web 30.

Still another source of a layer of heat sealable thermoplastic material 62, typically between 0.0005 and 0.007 inch thick, is applied to the moving drum 38 subsequent to the operation of die member 54 as described hereinabove. The web 62 passes over a tension roller 68 and then over an adjustable film lay-on roller 70 pivotally supported on an arm 72. Thus, the web 62 is positioned over a web 42.

Immediately downstream of the film lay-on roller 70 there is provided another die member 74 having a heated portion that is adapted to seal the sheets or webs together to form an enclosure or cap having an access opening therein. This last operation, in conjunction with the seam 22 that is formed, forms the generally rectangularly shaped hat 16 shown in FIG. 1. If desired, a roller 76 that is adapted to carry a supply of a mold release agent such as silicone may be placed in contact with the peripheral surface of the second heated die member 74. A support roller 78 immediately downstream of the die member 74 maintains the layers of plastic film 42 and 62 against the paper web 30. The remainders of the material of the film layers 42 and 44 which do not form the hat are removed by a scrap removal system generally designated by the reference character 60 which is adapted to apply suction to the non-formed plastic layers. Means (not shown) may also be provided for collecting the cut-off articles 10.

There will now be obvious to those skilled in the art, many modifications and variations of the article of manufacture, method and apparatus discussed hereinabove. These modifications and variations will not depart from the scope of the invention as defined by the following claims.

What is claimed is:

1. A disposable article of manufacture adapted to constitute a cap to be placed on the head of a user and comprising two face-to-face films of generally like configuration having interconnected peripheral edges defining an enclosure to receive said head, said enclosure having an opening to admit the head into said enclosure, one of said films including film strips adjacent said opening, said film strips constituting ties on said cap, said one film being provided with a T-shaped arrangement of slits adjacent said opening to form said ties in said one film, said films being of substantially equal breadth adjacent said opening, said strips cooperatively and substantially extending across the breadth of said one film at said opening, said films having parallel separated further edges adjacent and defining said opening, one of said slits being parallel to the further edge of said one film and extending less than fully across the breadth of the latter, the other of said slits extending between said one slit and the further edge of said one film.

2. An article of manufacture as claimed in claim 1 wherein said strips are integrally connected to said one film and constitute a part thereof.

3. An article of manufacture as claimed in claim 1 wherein the parallel edges are offset from each other.

4. An article of manufacture as claimed in claim 1 wherein said strips have a width in the order of magnitude of about 1/16–¾ of an inch.

5. An article of manufacture as claimed in claim 1 wherein said films have a height in the order of magnitude of about 6–16 inches.

6. An article of manufacture as claimed in claim 1 wherein said films have a seal therebetween at said peripheral edges said seal enlarging adjacent said strips to a width in the order of magnitude of 1/16–¼ of an inch whereby to form an anchors for said strips.

* * * * *